May 5, 1925.

R. C. PIERCE

TEMPERATURE CONTROLLED HEATING DEVICE

Filed Oct. 18, 1923  2 Sheets-Sheet 2

1,536,689

Inventor,
Raymond C. Pierce
By Ivan P. Tashof,
Attorney

Patented May 5, 1925.

1,536,689

UNITED STATES PATENT OFFICE.

RAYMOND C. PIERCE, OF NEW YORK, N. Y.

TEMPERATURE-CONTROLLED HEATING DEVICE.

Application filed October 18, 1923. Serial No. 669,439.

*To all whom it may concern:*

Be it known that RAYMOND C. PIERCE, citizen of the United States, residing at New York, in the county of New York and State of New York, has invented certain new and useful Improvements in Temperature-Controlled Heating Devices, of which the following is a specification.

My invention relates to an oven of the ordinary type having a thermostatic control acting upon the products of combustion from the source of heat, the thermostatic control being so constructed as to be economical to manufacture, easy to install and reliable in its operation. More particularly my invention consists in the use of such a thermostatic control in a portable oven. Ovens of this type, made of sheet metal, are made in large quantities, and are useful, convenient and relatively inexpensive. They may be used over an ordinary gas burner, and as a rule, are operated more economically than ovens permanently attached to burners such as cooking stoves. For example, oil stoves seldom have ovens which are permanently attached and portable ovens are found very useful in connection with baking or roasting on these stoves. However, I do not wish to confine the use of my thermostatic control to portable burners or ovens, since it may be applied to burners attached to or built with stoves of standard types. The thermostatic control is adapted to be used in conection with any gaseous or liquid fuel or if desirable with open wood or coal fires.

Broadly, my invention comprises in a heating device, the combination of external heating means, an oven located away from the source of heat or to one side so that low oven-temperatures may be obtained even when a large excess of fuel is provided, a passage way capable of being varied connecting the oven and the external heating means for the passage of products of combustion, a thermostat adapted to regulate the size of the passage way to maintain a predetermined temperature, a valve, a deflector preferably adjustable and moveable to direct the heat to secure uniform temperature and in addition act as a supporting means for the thermostat, and means for controlling the height of the deflector whereby the temperature of the heating device is adjusted and maintained. In the preferred form of my invention the deflector plate is adjustable and moveable but the construction of the apparatus may be varied so as to have the deflector plate stationary and the temperature-change controlled by the thermostatic element in conjunction with its related operative mechanism. The location of the oven in a raised position or to one side of the source of heat is very advantageous as it gives the products of combustion a chance to mix thoroughly and attain a uniform temperature before entering the oven.

More specifically, my invention consists in the features of construction and the arrangement of parts which will be exemplified in the construction hereinafter set forth and the scope of the application of which will be indicated in the following claims.

The invention will be described in connection with a single burner type. However, it is obvious that my thermostatic control may be applied to ovens using more than one burner. For the purpose of disclosing my invention the description will be given in connection with a thermostatically controlled oven located directly over the burner. However, an equally desirable construction may consist of an oven set to one side of a burner and connected thereto by means of an elbow heat conductor.

The invention is illustrated in its preferred embodiment in the accompanying drawing wherein.

Figure 1:
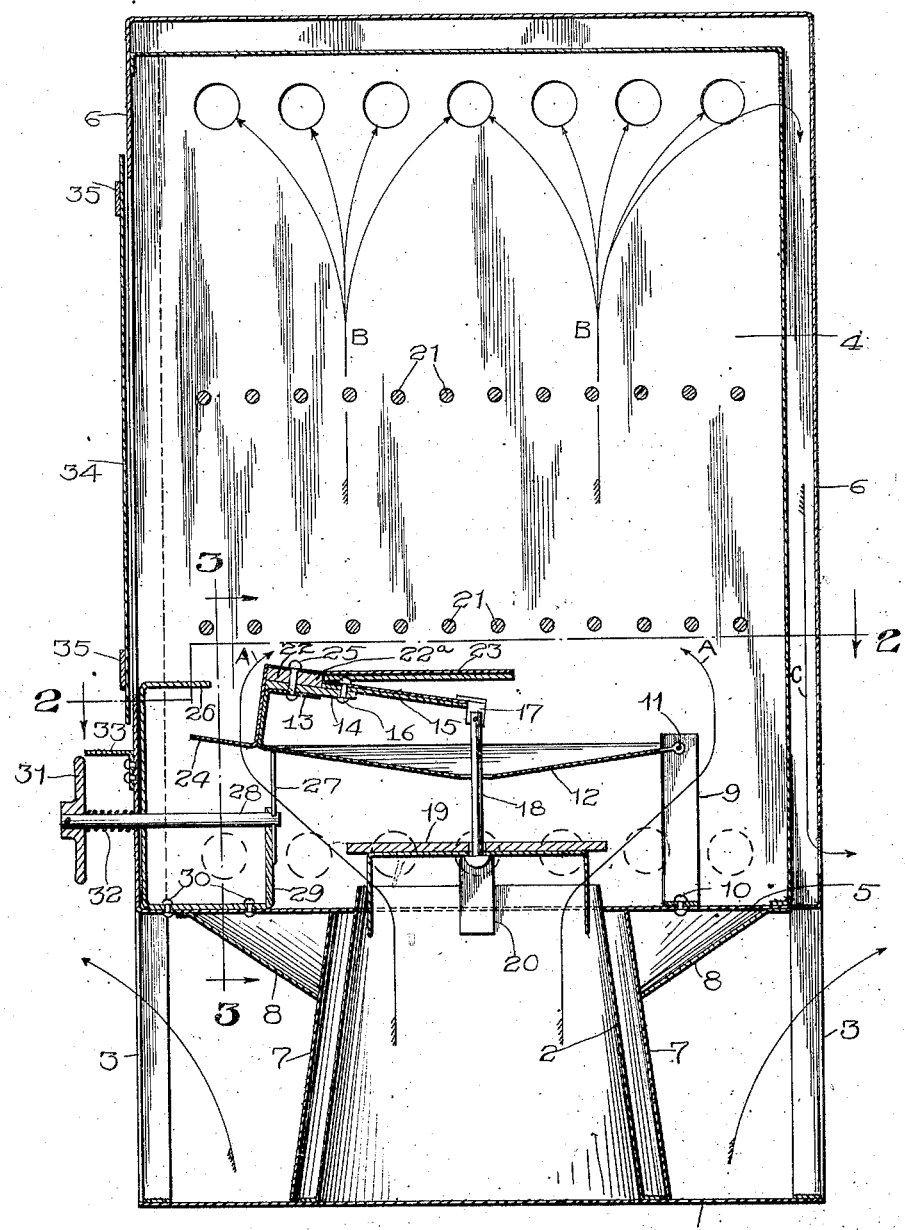
Figure 1, is a side cross sectional view of an oven equipped with the thermostatic control.
Figure 2:
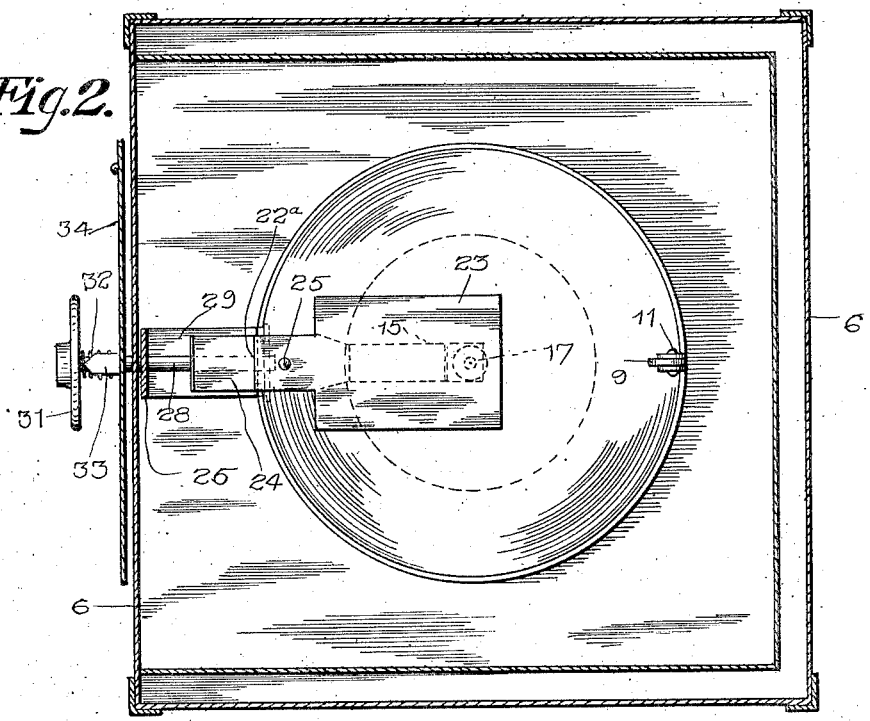
Figure 2, is a plan view partly in section taken on the line 2—2 of Figure 1.
Figure 3:
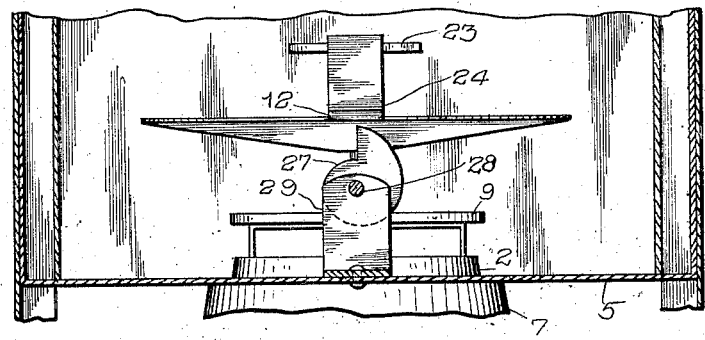
Figure 3, is a section on line 3—3 of Figure 1.

Referring to the drawing, 1 is a sheet metal oven-base with an aperture in its center. Concentric with the base 1 is a gas conducting tube or conduit 2 which furnishes a passage-way for the products of combustion of the fuel burned below the base 1 in a stove which supports the base and in turn the complete oven. The base 1 and the conduit 2 are somewhat elongated so as to provide a raised location for the oven 4, thereby affording the products of combustion a chance to attain a uniform temperature. Fastened to base 1 are corners supporting members 3 to which are attached the bottom 5 and sides 6 of the oven 4 thereby forming a mechanically strong structure. When it is desirable to obtain a relatively low temperature for slow baking, roasting or otherwise cooking such as is now done in fireless cookers, it is essential to insulate the oven carefully from external heat. For this purpose the conducting tube 2 is surrounded by an insulating jacket 7 and between the bottom 5 of the oven 4 and the upper portions of the jacket 7, there is an additional insulating jacket 8. When using the oven as a fireless cooker it is essential that the oven be away from the source of heat, either above or to one side, so that a low oven-temperature may be obtained even when a large excess of fuel is burned or otherwise provided.

The oven-bottom 5 has attached thereto a support 9. Any suitable attaching means may be employed, for example, a rivet 10. The latter carries a pin 11 which acts as a hinge pin for the heat deflecting plate 12, one end of which has an angle formation to form the arm 13. The plate 12 is hereinafter termed, "the deflector." The deflector serves two purposes:—to direct the heat to secure the uniform temperature which is essential and as a supporting means for the thermostatic controlling parts which preferably should be adjustable for the various desired temperatures. Mounted upon the arm 13 of the deflector 12 is a heat insulating block 14 which has a bi-metallic strip 15 attached thereto by means of a rivet 16. The bi-metallic metal is composed of two metals, one having a high co-efficient of expansion with heat and the other a low co-efficient of expansion. These strips are welded or otherwise secured together to form a solid piece of metal. When the temperature of a bi-metallic metal is raised, the metal having the highest co-efficient of expansion expands more than the other and becomes longer forcing the strip of metal into a curved form approximating the arc of a circle. Strip 15 is arranged so that the portion expanding most is on top or above the portion expanding least. Consequently, an increase of temperature causes the strip to bend downward. Attached to the end of the thermostatic strip 15 remote from the insulating block 14 is an arm 17 for supporting the valve stem 18, the valve 19 and the valve-guide 20. The valve 19 is preferably one of low heat conductivity.

The insulating block 14 not only supports the bi-metallic strip 15 but prevents heat from being conducted from the deflector 12 usually at a higher temperature than the strip 15. The spacing block 22 rests on the insulating block 14 and carries the combined plate and angle 23 which is flexed at 22ᵃ. Block 22 and the arm 13 are held together by any suitable means, such as the rivet 25. The plate portion 23 serves the purpose of preventing food or other material from dropping down on the thermostatic control parts and the angle portion 24 prevents, in conjunction with the stop 26, the whole assembly from swinging too far in case the oven is turned upside down.

The free end of the deflector 12 is supported by a cam 27 mounted on shaft 28, the latter being journalled in the bracket 29, which is attached to the oven-bottom 5 by means of rivets 30.

Figure 4:
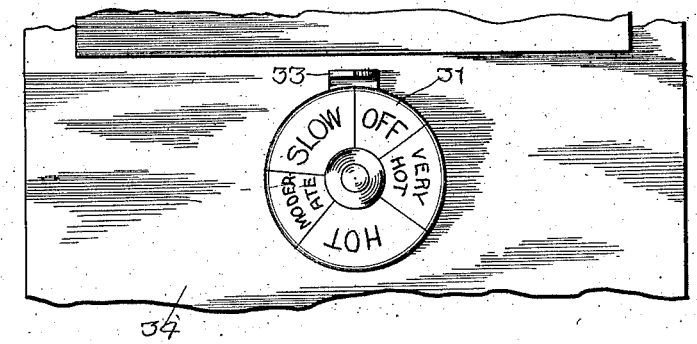
Figure 4, is a partial front elevation showing the heat-control hand-wheel.

A hand wheel or dial 31 suitably marked as shown in Figure 4 is mounted on shaft 28. Any end motion of the latter is taken up or controlled by a compression spring 32. This spring also serves to create frictional resistance to the movement of the cam 27 and thereby prevents rotation of these parts except as desired. The indicator 33 is mounted on the oven side 6.

The operation of the thermostat is as follows: The valve 19 is supported by a stem 18, an arm 17 and thermostatic strip 15 over the upper outlet of the heat conducting tube 2. When the strip 15 bends under the influence of heat, the valve stem 18, the valve 19 and the valve-guide 20 respectively move downward closing or partially closing the opening between the source of heat and the oven. If now the hand wheel 31, the shaft 28 and the cam 27 respectively are turned thereby raising the end of the heat deflector 12 moving about pin 11 as a center and also raising arm 17 proportionately, the valve 19 will be raised allowing more heat to flow into the oven and requiring a higher temperature in the oven to bend the strip 15 sufficiently to again regulate the opening into the oven of the heat conducting tube 2. Thus, by turning cam 27 thereby raising or lowering the valve 19 with reference to the top of the heat conducting tube 2, any desired temperature, high or low, within the range of the source of heat may be obtained and steadily maintained within the oven.

The oven 4 is provided with the usual door 34 hinged at 35. The numeral 21 designates the bars of the usual oven grate.

The path of the hot gases through the oven is shown by arrows A, B and C.

I claim:—

1. In a heating device, the combination of a thermostat, a valve, means operatively connecting the thermostat and valve, and a deflector to direct the products of combustion to secure a uniform temperature and adapted to support the thermostat.

2. In a heating device, the combination of a thermostat, a valve, means operatively connecting the thermostat and valve, and an adjustable deflector to direct products of combustion to secure a uniform temperature and adapted to support the thermostat.

3. In a heating device, the combination of a thermostat, a valve, means operatively connecting the thermostat and valve, an adjustable deflector adapted to support the thermostat, and means for controlling the height of the deflector whereby the temperature of the heating device is adjusted and maintained.

4. In a heating device, the combination of a thermostat, a valve, means operatively connecting the thermostat and valve, an adjustable deflector adapted to support the thermostat, and a cam for controlling the height of the deflector whereby the temperature of the heating device is adjusted and maintained.

5. In a heating device, the combination of a thermostat, a valve, means operatively connecting the thermostat and valve, an adjustable deflector adapted to support the thermostat, means for controlling the height of the deflector whereby the temperature of the heating device is adjusted and maintained, and means for preventing the assemblage of elements from swinging too far when the heating device is tipped or turned over.

6. In a heating device, the combination of a thermostat and valve, an adjustable deflector insulated from the thermostatic element and adapted to support the same, and means for controlling the height of the deflector whereby the temperature of the heating device is adjusted and maintained.

7. In a heating device, the combination of an oven, external heating means, a passage-way capable of being varied connecting the oven and external heating means for the passage of products of combustion, and a thermostat adapted to regulate the size of said passage-way to maintain a predetermined over-temperature, the distance between the heating means and the oven being sufficient to prevent the latter from being unduly heated when the passage-way is closed regardless of and independent of the heating means.

8. In a heating device, the combination of an oven, external heating means, a passage-way capable of being varied connecting the oven and external heating means for the passage of products of combustion, a thermostat, a valve, means operatively connecting the thermostat and valve, an adjustable deflector adapted to support the thermostat and means for controlling the height of the deflector whereby the temperature of the heating device is adjusted and maintained.

9. In a heating device, the combination of external heating means, an oven insulated therefrom, a passage-way capable of being varied connecting the external heating means and the oven for the passage of products of combustion, a thermostat, a valve, means operatively connecting the thermostat and valve, an adjustable deflector adapted to support the thermostat and means for controlling the height of the deflector whereby the temperature of the heating device is adjusted and maintained.

10. In a heating device, the combination of external heating means, an oven separate from the heating means, a passage-way for the products of combustion capable of being varied according to the temperature within the oven and connecting the oven and external heating means, temperature-controlling means for varying the size of the passage-way and means for protecting the temperature-controlling means from the products of combustion.

11. In a heating device, the combination of external heating means, an oven, a passage-way for the products of combustion capable of being varied according to the temperature within the oven and connecting the oven and external heating means, temperature-controlling means for varying the size of the passage-way and means for protecting the temperature-controlling means from the products of combustion.

12. In a heating device, the combination of external heating means, an oven separate from the heating means, a passage-way for the products of combustion capable of being varied according to the temperature within the oven and connecting the oven and external heating means and temperature-controlling means for varying the size of the passage-way.

13. In a heating device, the combination of external heating means, an oven separate from the heating means, a passage-way for the products of combustion capable of being varied according to the temperature within the oven and connecting the oven and external heating means, temperature-controlling means for varying the size of the passage-way and means for preventing the assemblage of elements from swinging too far when the heating device is tipped or turned over.

14. In a heating device, the combination of external heating means, an oven, a passage-way for the products of combustion capable of being varied according to the temperature within the oven and connecting the oven and external heating means, and temperature-controlling means capable of manual variation for varying the size of the passage-way.

15. In a heating device, the combination of external heating means, an oven located a sufficient distance away from the products of combustion as to afford the latter a chance to thoroughly mix and attain uniform temperature, a passage-way for the products of combustion capable of being varied according to the temperature within the oven and connecting the oven and external heating means, and temperature-controlling means for varying the size of the passage-way.

16. In a heating device, the combination of external heating means, an oven located a sufficient distance away from the products of combustion as to afford the latter a chance to thoroughly mix and attain a uniform temperature, a passage-way for the products of combustion capable of being varied according to the temperature within the oven and connecting the oven and external heating means, and temperature-controlling means for varying the size of the passage-way, and means for preventing the assemblage of elements from swinging too far when the heating device is tipped or turned over.

In testimony whereof he hereunto affixes his signature.

RAYMOND C. PIERCE.